United States Patent [19]

Croé

[11] Patent Number: 4,676,395

[45] Date of Patent: Jun. 30, 1987

[54] DISPLAY AND DISPENSING UNIT

[75] Inventor: Henri Croé, Eupen, Belgium

[73] Assignee: Caritas, Centrale d'Articles de Marques, Schaerbeek, Belgium

[21] Appl. No.: 591,216

[22] Filed: Mar. 19, 1984

[30] Foreign Application Priority Data

Mar. 25, 1983 [BE] Belgium .............................. 0/210398

[51] Int. Cl.⁴ ...................... B65G 59/06; G01N 27/46
[52] U.S. Cl. ........................................ 221/2; 221/130; 324/433
[58] Field of Search ..................... 221/2, 131, 92, 129, 221/130; 324/405, 433–435, 437; 312/72; 211/49 D; 186/33; D10/77

[56] References Cited

U.S. PATENT DOCUMENTS

| | | | |
|---|---|---|---|
| D. 183,296 | 8/1953 | Armato et al. ..................... | D10/77 |
| 2,093,983 | 9/1937 | Rothenberg ........................ | 324/437 |
| 2,636,795 | 4/1953 | Williams .......................... | 221/131 X |
| 3,010,606 | 11/1961 | Heselov ............................ | 221/92 |

Primary Examiner—F. J. Bartuska
Attorney, Agent, or Firm—McAulay, Fields, Fisher, Goldstein & Nissen

[57] ABSTRACT

A display and dispensing unit is provided which carries a first row of containers that are adapted to contain articles for dispensing and a second row of containers spaced above and recessed behind said first row of containers. Each of the containers is open at the bottom end and has a drawer to close the bottom end of the container. The drawer is sized to receive therein at least one of the articles stacked in the associated container, which drawer can be partially withdrawn therefrom so as to extract an article from the container. A sign is provided in relation to each container to indicate a characteristic of the articles for which the container is intended, and an explanatory panel is provided in respect of these signs.

2 Claims, 2 Drawing Figures

DISPLAY AND DISPENSING UNIT

This invention relates to a display and dispensing unit.

The object of the invention is, more particularly, to provide a display and dispensing unit which allows rational display of various articles and reliable dispensing of an article selected by the purchaser from similar various articles.

To this end, the display and dispensing unit according to the invention comprises:

a plinth, a support panel, containers carried by said panel, said containers being open at the bottom and adapted to container articles for dispensing, drawers which close the containers at the bottom and can be partially withdrawn therefrom so as to extract an article from the container, a sign on each container to indicate a characteristic of the articles for which the container is intended, and an explanatory panel in respect of these signs.

The display and dispensing unit according to the invention is intended more particularly for the display and dispensing of articles in a range of which the different types displayed and dispensed differ from one another only in respect of details which are frequently difficult to detect at first sight.

This is particularly the case when the articles are short cylindrical batteries which differ in respect of their diameters; there is quite a number of batteries of this kind whose diameters differ only byyl mm from batteries of the next largest or smallest diameter.

In one advantageous embodiment of the invention, the rear of the panel bears a display with information concerning articles of this kind for dispensing.

In one specific embodiment of the invention, the plinth has a forwardly projecting part, the explanatory panel being provided on the upper surface of said part.

In one preferred embodiment of the invention, the display and dispensing unit according to the invention comprises means for testing articles of the kind for which the containers are intended.

Other details and features of the invention will be apparent from the description of a display and dispensing unit according to the invention, which is given below by way of example without any limiting force and with reference to the accompanying drawings wherein.

Figure 1:
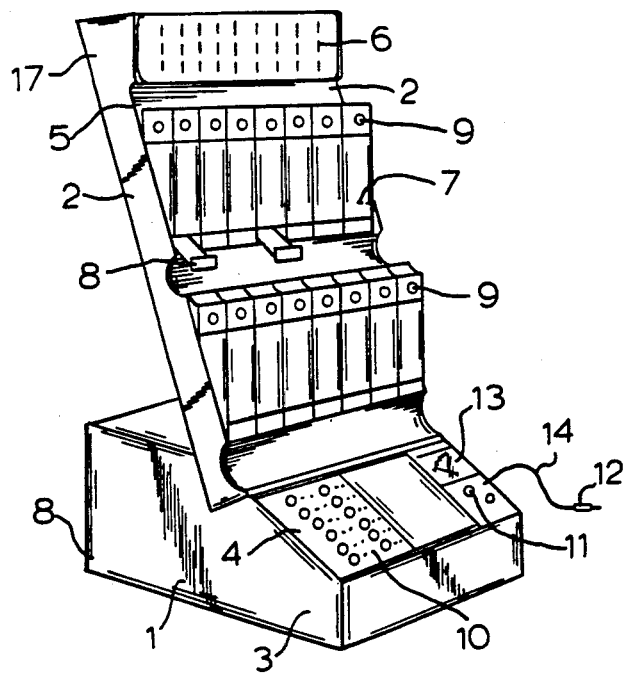
FIG. 1 is a perspective view of a display and dispensing unit according to the invention.
Figure 2:
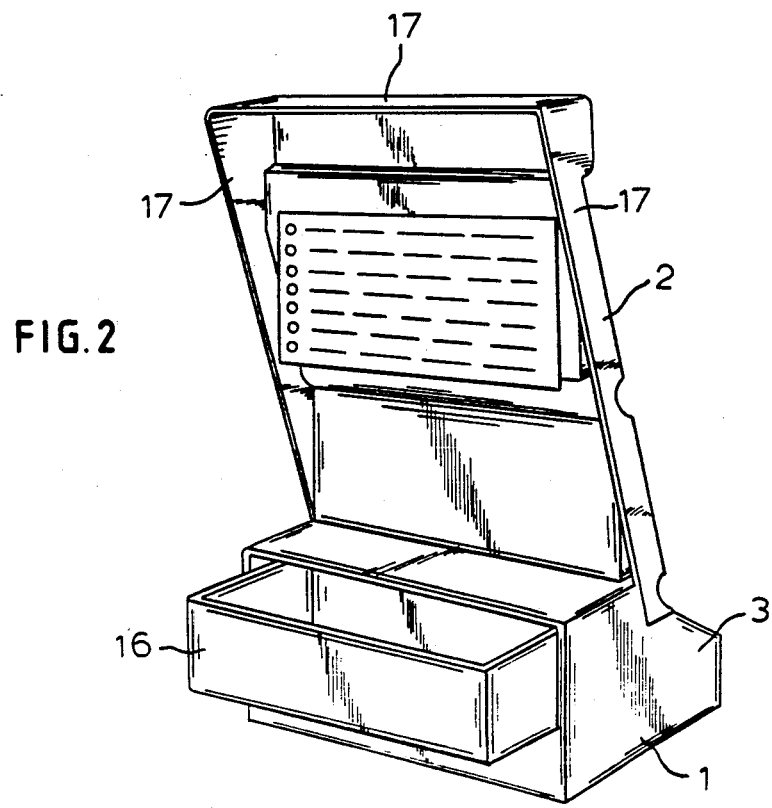
FIG. 2 is a second perspective view of the display and dispensing unit shown in FIG. 1.

Like references denote like components in the two Figures.

The display unit and dispenser shown in the drawings comprises a structure consisting basically of a plinth 1 surrounded by a carrier 2 in the form of a panel. Plinth 1 is hollow and has a projecting part 3, the top surface 4 of which is inclined forwardly. Panel 2 forms an acute angle to the vertical so that its front surface 5 is inclined forwardly and upwardly.

The surface 5 is at a greater inclination than the top surface 4.

Panel 2 is reinforced by rearwardly extending rims 17; at the top it carries a publicity sign 6 of a general nature concerning the articles for dispensing. Below the sign 6 the panel 2 has two rows of containers open top and bottom. The dimensions of a container 7 are equivalent to those of a packet of articles for dispensing. The packet is placed in the container with the bottom open so that the articles can leave the packet in the downard direction.

At the bottom, the container 7 has an individual drawer 8 which can be partially withdrawn from the container 7 by a horizontal movement.

The container 7 extends in a substatially vertical main direction and the drawer 8 extends in a substantially horizontal main direction.

In FIG. 1, two drawers 8 of the top row of containers 7 are shown in the dispensing position, the other drawers, and those of the bottom row of containers, being shown in the retracted position.

The drawer height is equivalent to the height of an article for dispensing. Consequently, when a drawer 8 is withdrawn so that it emerges sufficiently from its container 7 so that the article that it contains can be removed while remaining sufficiently in the container not to drop, the drawer entrains an article which is thus dispensed. When the empty drawer 8 is pushed back into the container 7 it automatically receives a new article for the next dispensing operation, and so on, until the packet in the container is exhausted.

When a packet is exhausted, the empty packet is withdrawn from the top of the container 7 and another full packet open at the bottom is introduced into the same container from the top.

The articles in the packets placed in a given container are identical, but packets containing different articles are introduced into different containers 7.

Each container 7 is provided with a sign 9 characteristic of the articles contained in the packets introduced into the container in question. The sign thereof varies from one container 7 to the next.

The upper surface 4 of the projecting part 3 of the plinth 1 is provided with an explanatory panel 10 concerning the signs 9. For example, the articles for dispensing may be flat cylindrical electric batteries of different diameters. These diameters may range from 11 to 12 mm up to 22 mm.

The signs 9 are in the form of a circle in a colour corresponding to a given size. Thus 12 different colours are equivalent to 12 different diameters.

The explanatory table gives beside each of the circles in a given colour not only the diameter of the corresponding battery expressed in figures and words, but also an illustration of a battery on a scale of 1:1 so that the user simply places a battery for replacement on the illustration to check immediately whether the batteries in the container provided with the circle in the colour in question are of the required size for replacement or are too large or small.

In the embodiment shown in the drawings, the panel 2 bears two rows of seven containers 7. There are twice two containers 7 bearing the same sign 9 and therefore intended for packets of identical articles. Of course these will be articles of the two types most in demand.

If the articles are batteries, the plinth 1 also caries means for testing batteries of this kind. These means comprise a fixed contact 11 and a movable contact 12 incorporated in an electrical circuit comprising a voltmeter, the dial 13 of which is located in the top surface 4 of the plinth 1. The movable contact 12 is connected to a lead 14 which also forms part of the said electrical circuit.

When one end of a battery is applied to the fixed contact 11 and the movable contact 12 is applied to the other end of the battery, the latter will be in series with the said voltmeter and the dial 13 will show whether the battery is completely used, already considerably used, or still good for normal use.

These different states correspond to different zones of the dial 13. The batteries to be tested in this way are batteries which the possible purchaser has already used and are not newly purchased batteries. The test is intended basically to inform the possible purchaser whether his tested battery does need replacing, although the test can also be used to check the quality of a newly purchased battery.

The rear of the panel 2 bears a display 15 with useful information to facilitate the purchaser's choice. In the case of a battery display and dispenser unit this information will, for example, give the coding used by different manufacturers for the different battery diameters. For example, manufacturer I codes 11 mm batteries as XY, while manufacturer II uses ZB etc.

When a possible purchaser needs to replace a battery coded XY by manufacturer I, he will see from the display 15 that he needs a new 11 mm diameter battery. Display 15 also shows that the batteries of this kind are contained in the container provided with a circle of a given colour.

Plinth 1 also has a drawer 16 at the rear. This drawer 16 is intended for use as needed and has no direct connection with actual dispensing. It can be used, for example, for the replaced batteries.

Of course, the invention is in no way limited to the embodiment described above and many modifications can be made thereto, particularly as regards the shape, number, construction and arrangement of the components used in its embodiment, without departing from the scope of this patent application.

For example, the battery testing means are not essential, the display and dispensing unit may be used to display and dispense articles other than batteries, and the drawer at the rear of the unit can be dispensed with.

I claim:

1. A display and dispensing unit comprising a plinth, a supporting panel carrying a first row of containers that are adapted to contain articles for dispensing, said support panel further carrying a second row of containers spaced above and recessed behind said first row of containers, each of said containers being open at a bottom end, and having a drawer to close the bottom end of the container, which drawer can be partially withdrawn therefrom so as to extract an article from the container, a sign being provided in relation to each container to indicate a characteristic of the articles for which the container is intended, and an explanatory panel in respect of these signs, said unit further comprising means for testing articles of the kind which are to be dispensed from the containers.

2. A display and dispensing unit according to claim 1, wherein the said test means is mounted on the projecting part of the plinth.

* * * * *